United States Patent
Chen et al.

(10) Patent No.: US 8,035,820 B2
(45) Date of Patent: *Oct. 11, 2011

(54) METHOD AND APPARATUS FOR RESONANT FREQUENCY IDENTIFICATION THROUGH OUT-OF-PLANE DISPLACEMENT DETECTION

(75) Inventors: Liang-Chia Chen, Taipei County (TW); Chung-Chu Chang, Taipei (TW); Yao-Ting Huang, Taipei (TW); Jin-Liang Chen, Hsinchu (TW)

(73) Assignee: Industrial Technology Research Insitute, Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 12/837,419

(22) Filed: Jul. 15, 2010

(65) Prior Publication Data

US 2010/0277744 A1 Nov. 4, 2010

Related U.S. Application Data

(62) Division of application No. 11/987,237, filed on Nov. 28, 2007, now Pat. No. 7,782,466.

(30) Foreign Application Priority Data

Dec. 12, 2006 (TW) .............................. 95146516 A (51) Int. Cl.
G01B 11/02 (2006.01)
(52) U.S. Cl. ..................................................... 356/498
(58) Field of Classification Search .................. 356/502; 73/655, 657
See application file for complete search history.

(56) References Cited

U.S. PATENT DOCUMENTS

| | | | |
|---|---|---|---|
| 3,823,604 A * | 7/1974 | Burch et al. ..................... 73/656 |
| 4,871,255 A | 10/1989 | Tenjinbayashi |
| 4,913,550 A | 4/1990 | Montgomery et al. |
| 5,408,305 A | 4/1995 | Webster et al. |
| 5,841,030 A * | 11/1998 | Honsberg et al. ................ 73/579 |
| 6,219,145 B1 | 4/2001 | Gutierrez et al. |
| 7,177,029 B2 * | 2/2007 | deGroot ........................ 356/497 |
| 7,536,265 B2 * | 5/2009 | Chen et al. ........................ 702/56 |
| 7,782,466 B2 * | 8/2010 | Chen et al. ..................... 356/498 |
| 2005/0007599 A1 * | 1/2005 | deGroot ........................ 356/511 |
| 2005/0027917 A1 | 2/2005 | Hartman et al. |
| 2005/0279172 A1 * | 12/2005 | Schreier et al. ................. 73/657 |
| 2008/0137095 A1 * | 6/2008 | Chen et al. ..................... 356/498 |
| 2008/0243441 A1 * | 10/2008 | Chen et al. ..................... 702/190 |
| 2008/0259344 A1 * | 10/2008 | Osborn et al. ................. 356/450 |
| 2009/0161118 A1 * | 6/2009 | Ziegenbein et al. .......... 356/601 |
| 2009/0180124 A1 * | 7/2009 | Chen et al. ..................... 356/496 |
| 2009/0180679 A1 * | 7/2009 | Hackney et al. .............. 382/141 |

FOREIGN PATENT DOCUMENTS

| TW | 314590 A4 | 9/1997 |
|---|---|---|
| TW | I227777 | 2/2005 |

* cited by examiner

*Primary Examiner* — Patrick J Connolly
(74) *Attorney, Agent, or Firm* — Birch, Stewart, Kolasch & Birch, LLP (57) ABSTRACT

A method for out-of-plane displacement detection is disclosed. The out-of-plane displacement is detected by analyzing all the fringe density indexes calculated using the frequency-domain information extracted from a series of interference images of the sample vibrating at different frequencies. The present invention further discloses a method and an apparatus for resonant frequency identification by detecting the peak value of all the fringe indexes calculated at different scanning frequencies. With the identified resonant frequency, the full-field vibratory surface profile of the sample in various resonance modes can be reconstructed.

16 Claims, 11 Drawing Sheets

| Resonance Mode | ANSYS Value (kHz) | Measured Value (kHz) | Variance |
|---|---|---|---|
| 1st Resonance | 10.97 | 10.9 | -0.6% |
| 2nd Resonance | 68.77 | 63.9 | -7.1% |
| 3rd Resonance | 192.59 | 205.4 | 6.7% |
| 4th Resonance | 377.65 | 403.1 | 6.7% |
| 5th Resonance | 625.22 | 659.4 | 5.5% |
| 6th Resonance | 1056.37 | 1001.3 | -5.2% |

METHOD AND APPARATUS FOR RESONANT FREQUENCY IDENTIFICATION THROUGH OUT-OF-PLANE DISPLACEMENT DETECTION

CROSS REFERENCE TO RELATED APPLICATIONS

This application is a Divisional of application Ser. No. 11/987,237 filed on Nov. 28, 2007, now U.S. Pat. No. 7,782,466 which claims priority to Application No. 095146516 filed in Taiwan, on Dec. 12, 2006. The entire contents of all of the above applications is hereby incorporated by reference.

BACKGROUND OF THE INVENTION

The present invention generally relates to resonant frequency identification, especially for resonant frequency identification through out-of-plane displacement detection.

The conventional optical interferometric surface profilometer has been developed mainly for static measurement of nano-scale three-dimensional surface profiles. It has been widely employed for measuring surface roughness and uniformity on semiconductor wafer, depth of laser mark, metal-bump size and co-planarity during flip chip bonding, size and height of spacers in liquid-crystal display panels, and surface profile of fiber end-face and micro optical devices. In recent years, vibratory measurement has been incorporated into the optical interferometric surface profilometer, thus widening its applications in observing and measuring the vibratory behavior of functional elements and thin-films in micro-electro-mechanical system (MEMS) and micro-opto-electro-mechanical system (MOEMS) industries.

When making dynamic measurement of objects in vibration, the laser-Doppler anemometry is the most commonly used. However, it is applicable for single-point measurement. Two-dimensional measurement of objects in vibration requires laser scanning point by point, which is more time-consuming and easily affected by environmental factors. Therefore, these measures may hardly obtain real-time full-field measurement of the surface profile of an object in vibrating mode.

Take Polytec MSA400, which is adapted from a Mach-Zehnder interferometer, for example. Polytec MSA400 comprises a laser-Doppler module, a white-light interferometric static three-dimensional profilometer and a stroboscopic in-plane displacement measurement module. When making out-of-plane displacement measurement, Polytec MSA400 first determines the optimal sampling points and paths of the area under test using its embedded software. Then the laser-Doppler module scans the pre-determined sampling points at a resonant frequency according to a set scanning frequency range and resolution. As a result, a resonant spectrum is obtained for each sampling point. All resonant spectrums are then combined to form a three-dimensional profile of out-of-plane displacement. However, the above-mentioned technology cannot perform full-field measurement, and the measurements obtained by Polytec contain no phase information.

According to the above, current systems and available technologies may have the following issues.

(1) Laser beams may cause damage to micro-devices under test due to overheating;
(2) The time-averaging approach may require manual identification of the resonant frequency;
(3) The laser source is relatively expensive and installation thereof is complicated, making it unsuitable for general MEMS/MOEMS systems.

Moreover, U.S. Pat. No. 6,219,145 discloses a Michelson interferometer using an ultra-bright LED for dynamic measurement. However, during stroboscopic flashing, the displacement of the object under test has to be smaller than $\frac{1}{20}$ of the wavelength of the light source; otherwise, fringes of the interference images may become blurred.

US Pat. Pub. No. 2005/027917 discloses a measurement and visualization technology for acquiring images of a vibrating object under test. However, the image information acquired concerns mainly marks, such as lines or paint, or a speckle pattern on the surface of the object under test. Resonant frequencies of the object under test are then identified using conventional image processing technologies.

SUMMARY OF THE INVENTION

It is the primary objective of the present invention to provide a method for out-of-plane displacement detection.

It is the secondary objective of the present invention to provide a method and an apparatus for resonant frequency identification using the out-of-plane displacement detected by the abovementioned method.

In order to achieve the primary objective, the present invention provides a method for detecting the out-of-plane displacement of the object under test, comprising steps of: acquiring a series of interference images from a vibrating sample; processing the interference images acquired using image-filtering; extracting frequency-domain information from the series of processed images to calculate a fringe density index; and detecting the out-of-plane displacement of the vibrating sample using the fringe density index calculated.

In order to achieve the secondary objective, the present invention further provides a method for identifying the resonant frequency, comprising steps of: (a) setting a scanning frequency range, which includes a series of scanning frequencies; (b) vibrating the sample according to a scanning frequency within the set range; (c) acquiring synchronously an interference image from the vibrating sample; (d) processing the interference images acquired using image-filtering; (e) extracting frequency-domain information of the processed images to calculate the fringe density index; (f) choosing another scanning frequency; repeating Steps (b)-(e) if the new scanning frequency is within the set range; otherwise, proceed with Step (g) detecting the peak value by analyzing the fringe density to identify the resonant frequency of the vibrating sample.

In order to achieve the secondary objective, the present invention further provides an apparatus for detecting the out-of-plane displacement and identifying the resonant frequency, comprising: a central control unit; a synchronous control unit, coupled to the central control unit, for generating the first, second and third control signals synchronously with the control signal of the central control unit; a vibration-driving unit for carrying and vibrating the sample upon receiving the first control signal; a light-emitting unit for generating a stroboscopic flash upon receiving the second control signal; and an image acquisition unit for acquiring an interference image from the sample upon receiving the third control signal, and transmitting the interference image acquired to the central control unit.

BRIEF DESCRIPTION OF THE DRAWINGS

The objectives and advantages of the preferred embodiment of the present invention will be readily understood by the accompanying drawings and detailed descriptions, wherein.

DETAILED DESCRIPTION OF THE PREFERRED EMBODIMENT

The present invention can be exemplified by the preferred embodiment as described hereinafter.

Figure 1A:
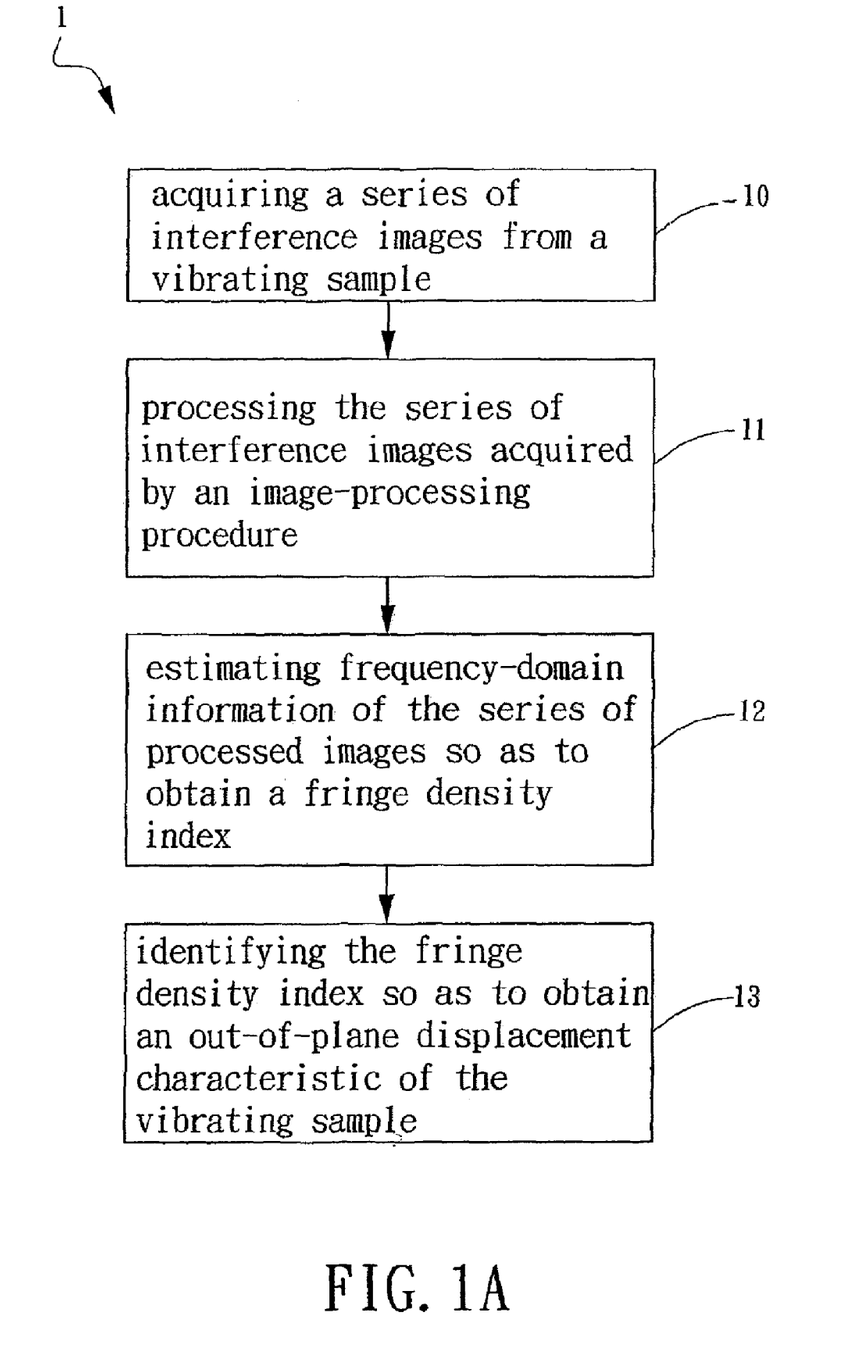
FIG. 1A is a flow-chart showing a method for out-of-plane displacement detection according to one embodiment of the present invention.

Refer to FIG. 1A, which is a flow-chart showing a method for out-of-plane displacement detection according to one embodiment of the present invention. The method comprises steps described hereinafter. First, in Step 10, a series of interference images are acquired from a vibrating sample. The vibrating sample can be a micro-mechanical structure or device, such as a cantilever and a probe of an atomic force microscopy (AFM). However, the present invention is not limited thereto. Then, in Step 11, the series of interference images acquired are processed by an image-processing procedure.

Figure 1B:
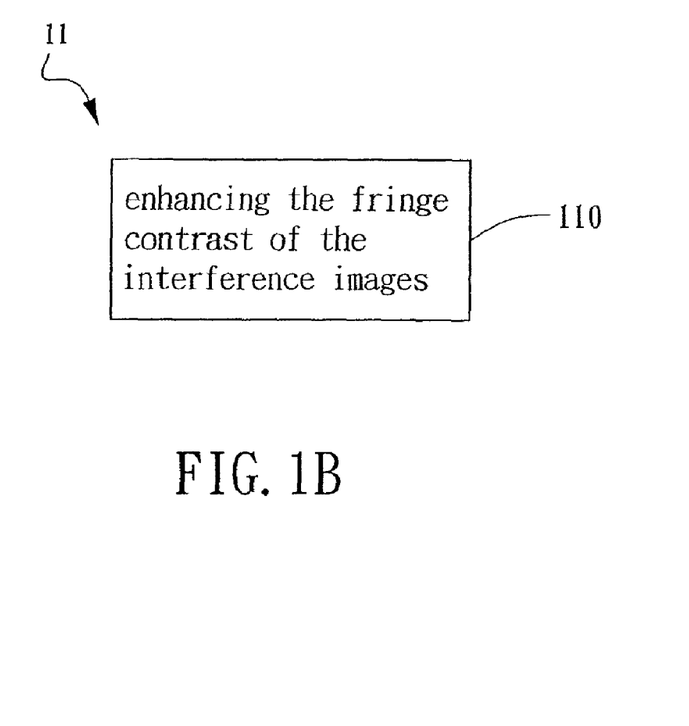
FIG. 1B is a flow-chart showing an image-processing procedure for out-of-plane displacement detection according to the present invention.

Refer to FIG. 1B, which is a flow-chart showing an image-processing procedure for out-of-plane displacement detection according to the present invention. The image-processing procedure involves a noise-filtering algorithm. In Step 110, the interference images are normalized. In general, the gray-scale value of the acquired images with interferometric fringes may be different from that of the acquired images without interferometric fringes. Normalization can enhance the fringe contrast of the interference images. This can overcome the problem of unstable gray-scale value caused by variation in luminance in different acquired images.

Figure 1C:
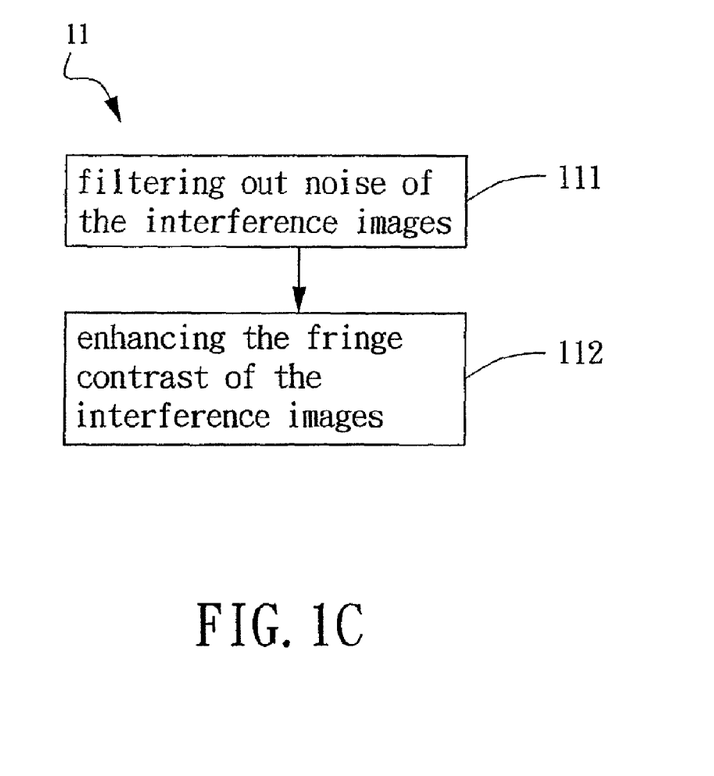
FIG. 1C is a flow-chart showing another image-processing procedure for out-of-plane displacement detection according to the present invention.

Apart from that shown in FIG. 1B, another image-processing procedure for out-of-plane displacement detection according to the present invention is displayed in FIG. 1C. This image-processing procedure also involves a noise-filtering algorithm. The image-processing procedure comprises steps described hereinafter. In Step 111, the noise of the interference images is filtered. For example, noise of the interference images due to contamination of the vibrating sample, such as dust or foreign particles, can be removed by a low-pass filter. In Step 112, the interference images are normalized to enhance the fringe contrast of the interference images.

Refer again to FIG. 1A, in Step 12, frequency-domain information of the processed images is extracted from the spatial frequency distribution of fringes. The fringe density index is calculated using the pixel parameters (for example, resolution and contrast) of the processed images. The higher the frequency, the more obvious the vibration of the sample is.

In the present embodiment, the spatial frequency distribution of fringes is calculated using multi-coefficient correlation to yield the fringe density index. There are many algorithms for multi-coefficient correlation, such as autocorrelation function F5 or F4 proposed by Vollath. In the present embodiment, Vollath's autocorrelation function F4 (as expressed in equation 1) is employed to calculate the fringe density index of the interference images at the predetermined vibrating frequency. Finally, in Step 13, the out-of-plane displacement of the vibrating sample is obtained according to the fringe density index calculated. The out-of-plane displacement with a peak fringe density index denotes the maximum out-of-plane displacement of the vibrating sample or a full-field vibratory surface profile of the vibrating sample at a resonant frequency.

$$F_{vol14} = \sum_{x=1}^{M-1} \sum_{y=1}^{N-1} I(x, y) \times I(x+1, y) - \sum_{x=1}^{M-2} \sum_{y=1}^{N} I(x, y) \times I(x+2, y) \quad (1)$$

wherein I(x,y) is the gray-scale value of the interference images, M and N represent sizes of the image.

In addition to multi-coefficient correlation, image differentiation (such as thresholded absolute gradient algorithm or squared gradient algorithm), depth of peaks and valleys (such as image threshold content algorithm or image power algorithm), image contrast (such as variance algorithm or normalized variance algorithm), gray-scale histogram (such as gray-scale range algorithm or gray-scale entropy algorithm) or frequency-domain analysis (such as Laplacian algorithm) can also be employed to obtain the fringe density index.

Figure 2A:
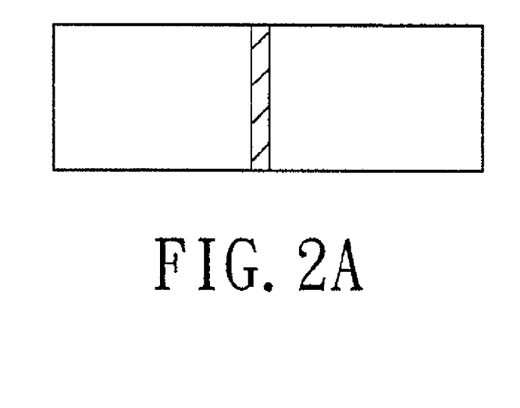
FIG. 2A to FIG. 2D are processed images of the vibrating sample showing different fringe densities.
Figure 2B:
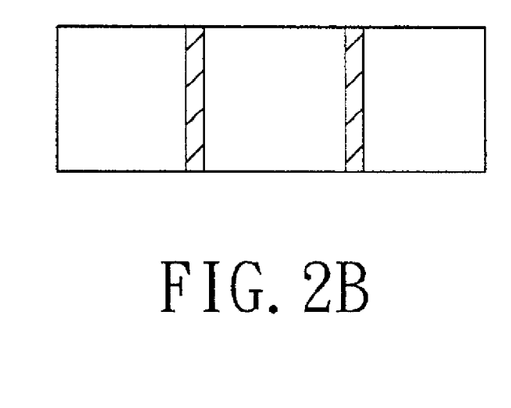
Figure 2C:
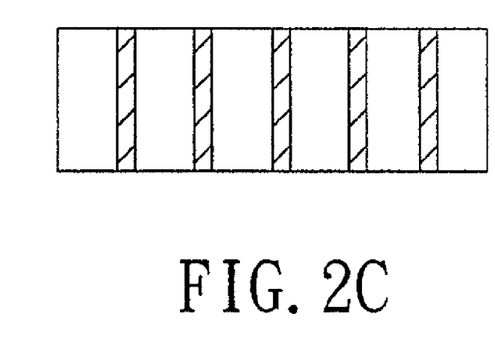
Figure 2D:
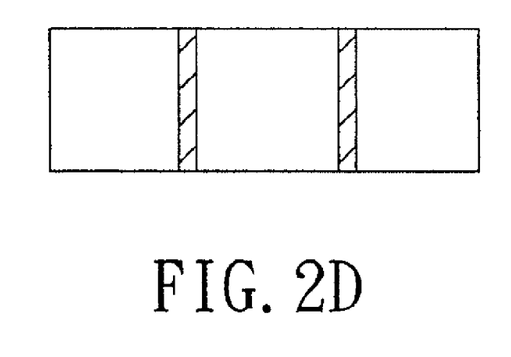

FIG. 2A to FIG. 2D displays a series of processed images of the vibrating sample. There is a fringe pattern (shaded region in the figures) in each image, showing the fringe density. In the present embodiment, the number of fringes in FIG. 2C is the largest, meaning that the image represented by FIG. 2C has the largest out-of-plane displacement.

Figure 3:
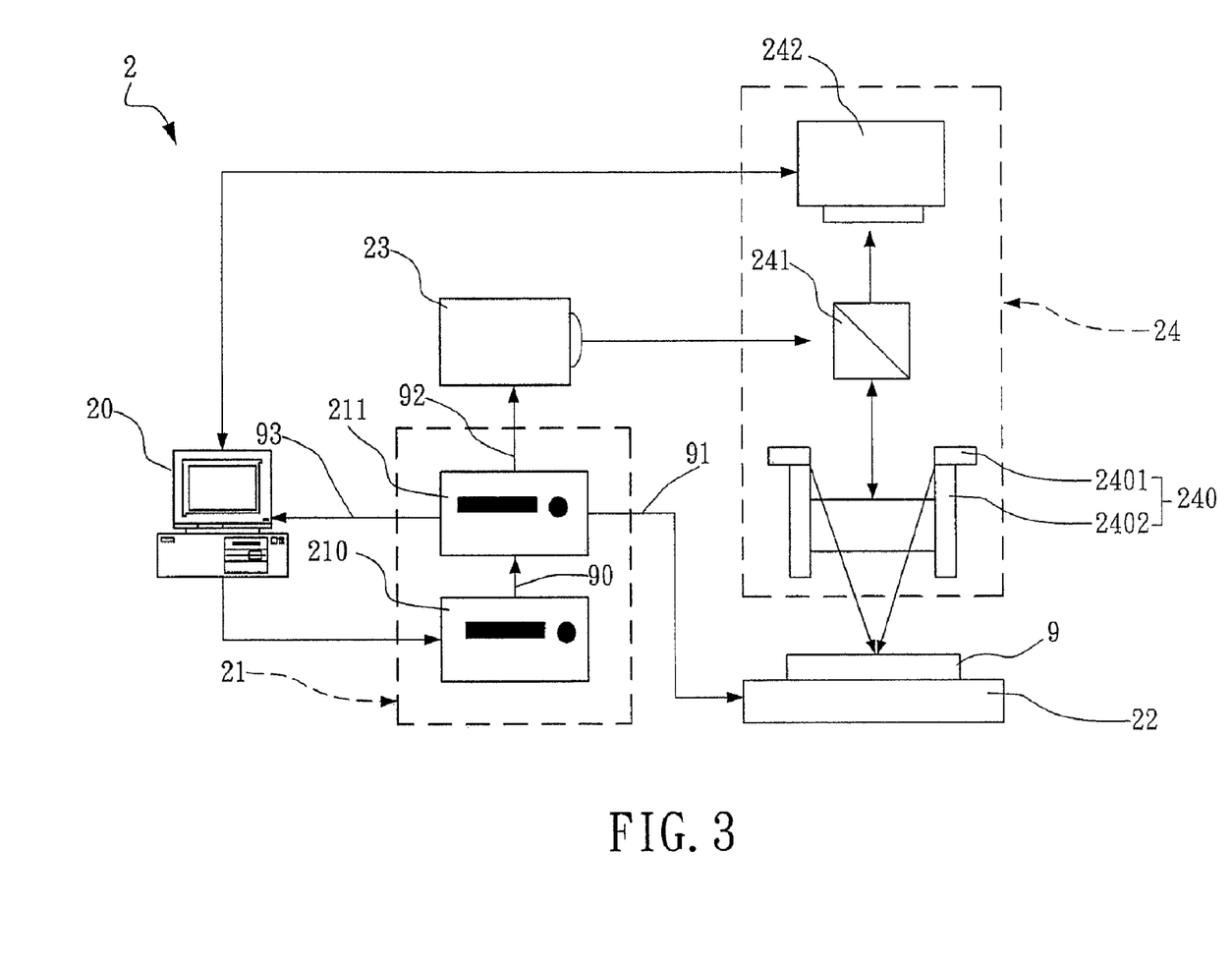
FIG. 3 is a schematic diagram showing an apparatus for out-of-plane displacement detection and resonant frequency identification according to one embodiment of the present invention.

Refer to FIG. 3, which is a schematic diagram showing an apparatus for out-of-plane displacement detection and resonant frequency identification according to one preferred embodiment of the present invention. Apparatus 2 comprises a central control unit 20, a synchronous control unit 21, a vibration-driving unit 22, a light-emitting unit 23 and an image-acquiring unit 24. The central control unit 20 is coupled to the synchronous control unit 21 and the image-acquiring unit 24. The central control unit 20 can be any calculation device capable of data processing, such as a computer or a workstation. The central control unit 20 controls the synchronous control unit 21 and the image-acquiring unit 24 by its embedded software. The synchronous control unit 21 comprises a wave-form generator 210 and a synchronous controller 211. Upon receiving a request from the central unit 20, the wave-form generator 210 generates the control signal 90, which can be a pulse, a sine-wave or a square-wave. Using the control signal 90 generated by the wave-form generator 210, the synchronous control unit 21 generates synchronously the first control signal 91, the second control signal 92, and the third control signal 93.

The vibration-driving unit 22 carries the sample 9 and vibrates it upon receiving the first control signal 91. In the present embodiment, the vibration-driving unit 22 is a piezoelectric element (PZT) vibration-driving unit. Other similar devices can also be used. The light-emitting unit 23 is coupled to the synchronous control unit 21 and generates a stroboscopic flash upon receiving the second control signal 92. In the present embodiment, the light-emitting unit 23 is a light-emitting diode. Other similar devices can also be used. Compared with conventional laser sources, the light-emitting unit 23 in the present invention consumes relatively less energy, thus avoiding damage to micro elements due to overheating. Moreover, the stroboscopic light-emitting unit 23 can be installed in a general microscopic interferometry. Without the use of laser as in laser-Doppler anemometry, the apparatus of the present invention is less complex and incurs much lower manufacturing cost.

The image-acquiring unit 24 is coupled to the central control unit 20. Upon receiving the third control signal 93, the image-acquiring unit 24 acquires an interference image from the sample 9 and transmits the interference image acquired to the central control unit 20. In the present embodiment, the image-acquiring unit 24 comprises a lens module 240, a beam-splitter 241 and a charge-coupled device (CCD) 242. The lens module 240 comprises a driver 2401 for controlling an interference object lens 2402 to scan vertically the sample 9. The beam-splitter 241 receives the stroboscopic flash to guide the light into the lens module 240 and then projects the light onto the vibrating sample 9. The beam-splitter 241 further receives the light reflected from the vibrating sample 9 to generate an interference pattern. The interference pattern corresponding to the vibrating sample 9 is acquired by the charge-coupled device (CCD) 242 to form the interference image, which is later transmitted to the central control unit 20 for image analysis.

Figure 4A:
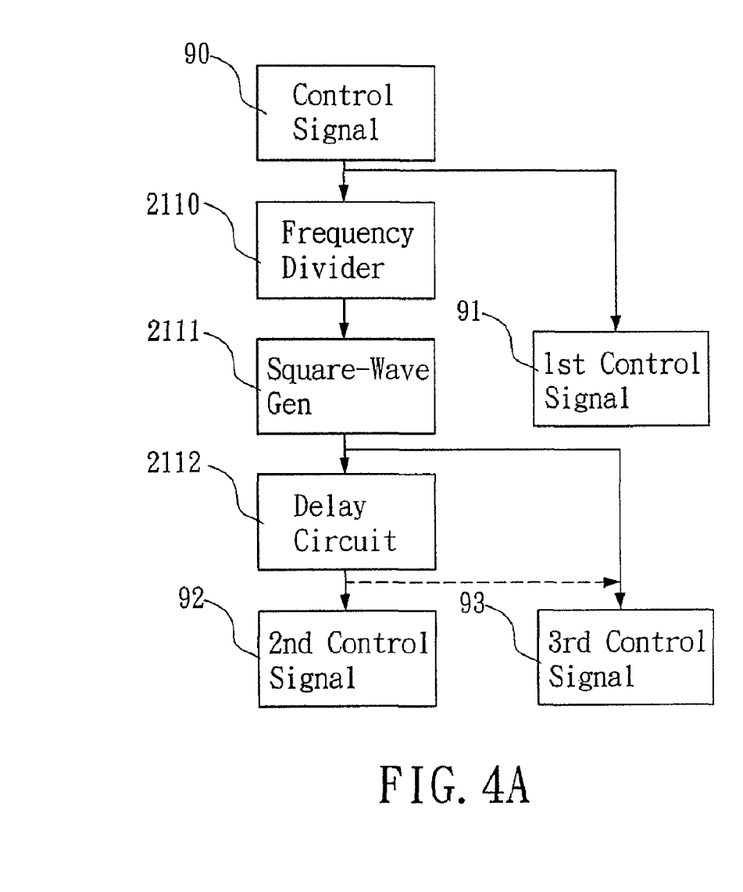
FIG. 4A and FIG. 4B show the synchronous control unit according to one embodiment of the present invention.
Figure 4B:
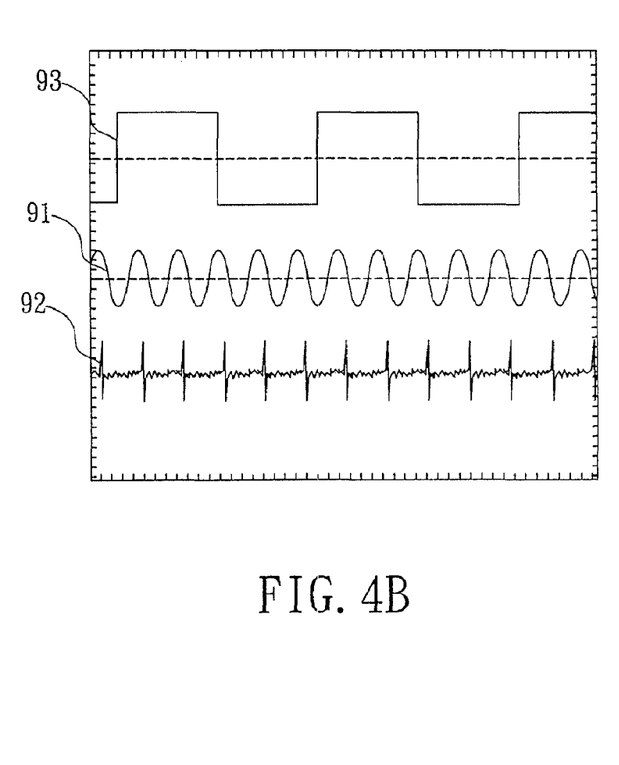

The synchronous control unit 21 of the present invention is described hereinafter. The characteristic feature of the synchronous control unit of the present invention is that upon receiving a frequency control signal, the synchronous controller generates control signals of different subdivided lower frequencies to other control units, so that all the controlled units can operate synchronously. Refer to FIG. 4A and FIG. 4B, which show the synchronous control unit 21 according to the first embodiment of the present invention. In the present embodiment, the synchronous signal is generated using the control signal from the wave-form generator. Refer again to FIG. 3, FIG. 4A and FIG. 4B, the synchronous controller 211 generates the first control signal 91, which is a sine-wave, upon receiving the control signal 90 from the wave-form generator 210. First, the synchronous controller 211 receives the control signal 90 and generates a frequency-dividing signal using a frequency divider 2110. The frequency-dividing signal is then transmitted to a square-wave generator 2111, which generates a square-wave signal. The square-wave signal is delayed by a delay circuit 2112 to form a delay signal. Both the square-wave signal and the delay signal are employed to generate the second control signal 92. The third control signal 93 can be generated either by the delay circuit 2112 or the square-wave generator 2111.

Figure 5:
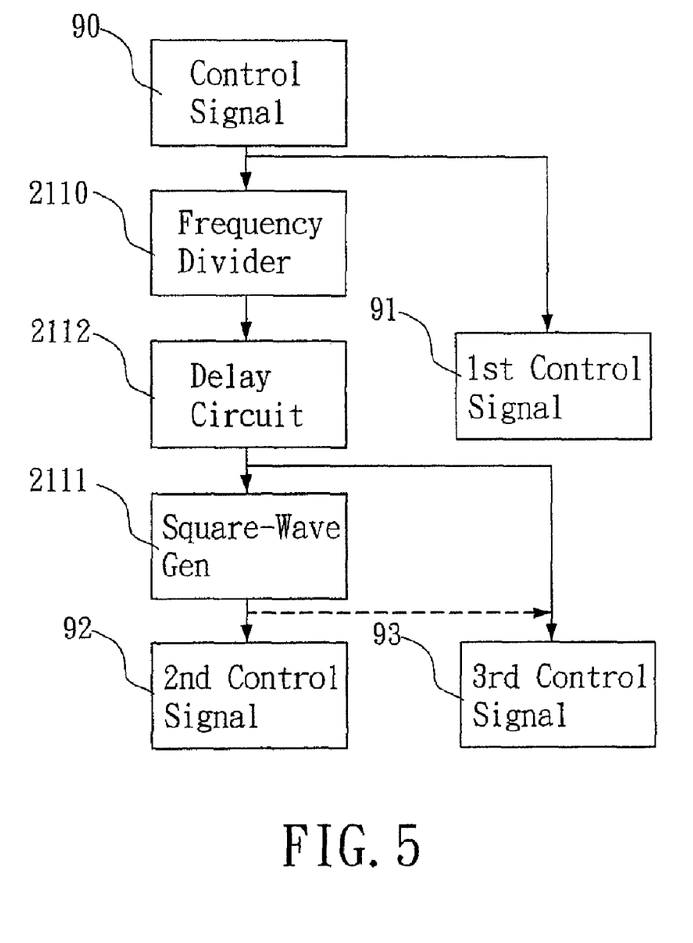
FIG. 5 shows the synchronous control unit according to another embodiment of the present invention.

Refer to FIG. 5, which shows the synchronous control unit 21 according to the second embodiment of the present invention. Compared with the first embodiment as shown in FIG. 4A, the sequence of the square-wave generator 2111 and the delay circuit 2112 in the present embodiment are reversed. That is, the square-wave generator 2111 receives and converts both the frequency-dividing signal from the frequency divider 2110 and the delay signal from the delay circuit 2112 into square-wave signals to generate the second control signal 92. Same as the first embodiment, the third control signal 93 can be generated either by the delay circuit 2112 or the square-wave generator 2111.

Figure 6:
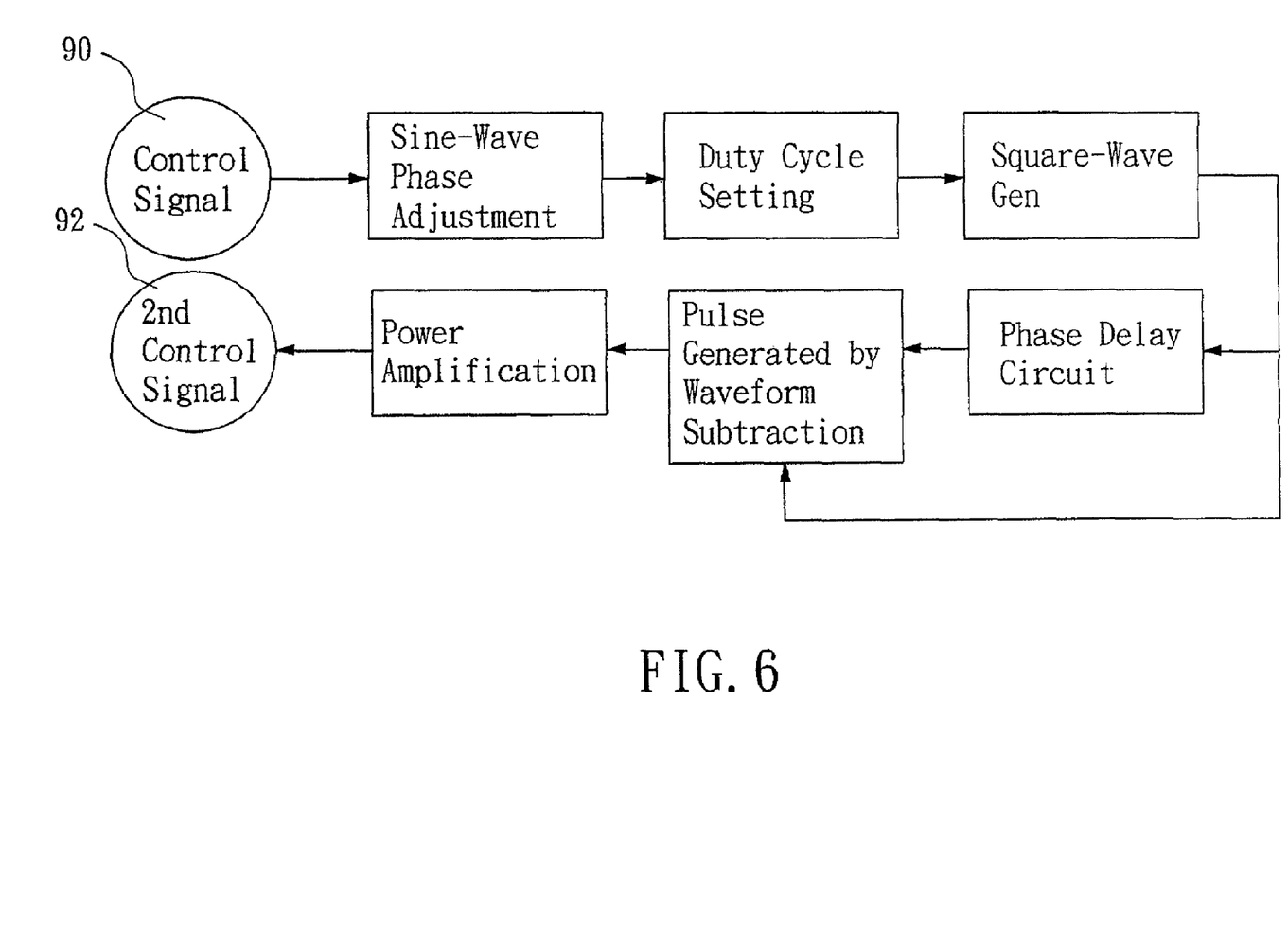
FIG. 6 is a flow-chart showing a process for generating the second control signal.

The flow-chart shown in FIG. 6 describes the process for generating the second control signal. First, the sine-waves generated from the control signal 90 by the synchronous controller 211 undergo sine-wave phase adjustment followed by duty cycle setting. The square-wave generator then generates a square-wave signal, which is transmitted into the phase delay circuit. Then, a pulse is generated by waveform subtraction, wherein the phase delay signal from the phase delay circuit is subtracted by the square-wave signal from the square-wave generator. The pulse is then amplified to become the second control signal 92 for controlling the stroboscopic light-emitting unit 23.

Figure 7:
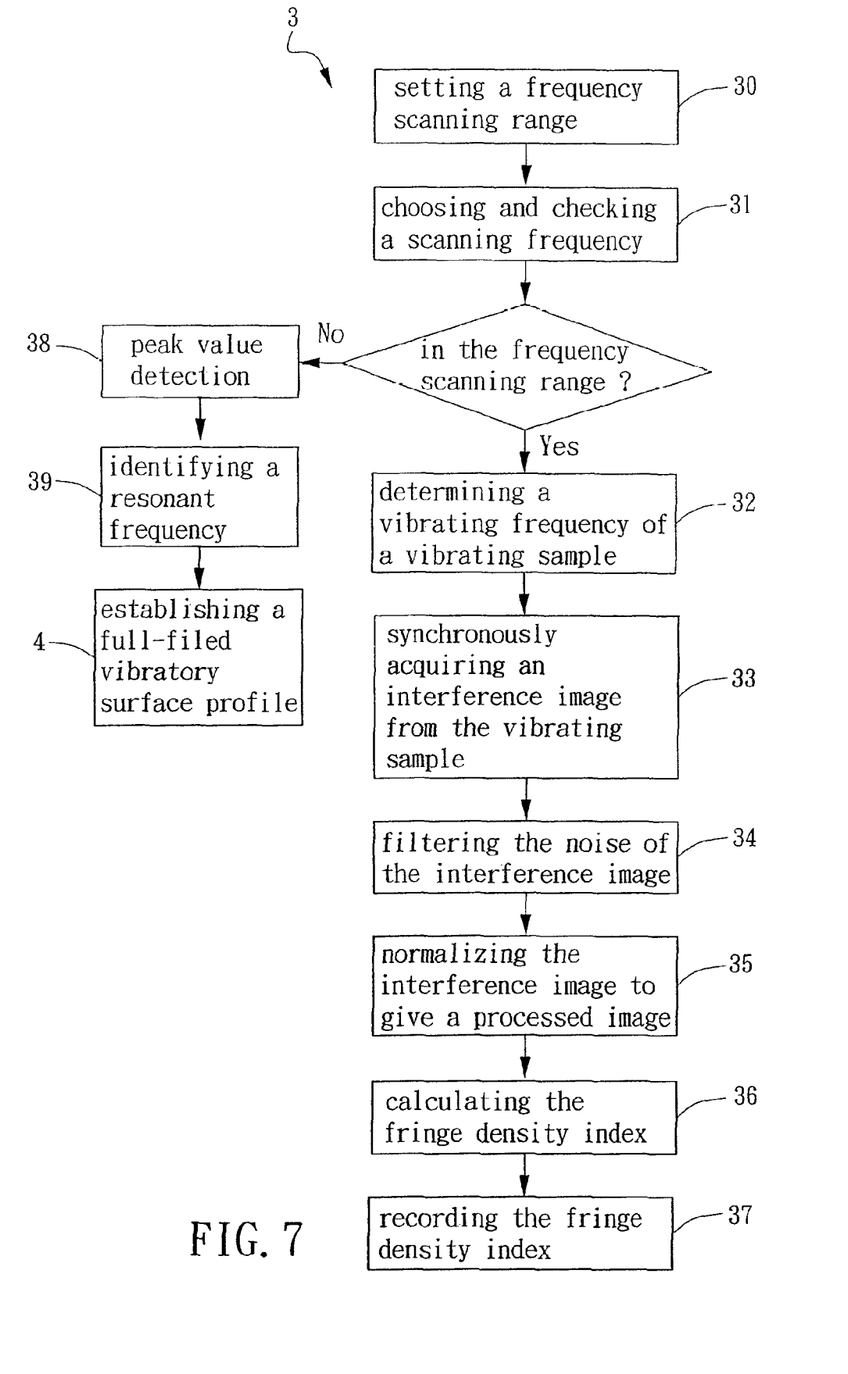
FIG. 7 is a flow-chart showing a method for resonant frequency identification according to the preferred embodiment of the present invention.

The method for resonant frequency identification is described hereinafter. To begin with, an apparatus for out-of-plane displacement detection and resonant frequency identification as shown in FIG. 3 is provided. Refer to FIG. 7, which is a flow-chart showing the method 3 for resonant frequency identification. In the present embodiment, an AFM probe serves as the sample to be examined. First, the central control unit performs Step 30 to set a scanning frequency range, which includes a series of scanning frequencies. In the present embodiment, the scanning frequency range is 1 kHZ to 1200 kHZ at a frequency interval of 0.1 kHZ. Both the scanning frequency range and the frequency interval are not limited hereto and can be adjusted depending on their use. In Step 31, a scanning frequency is first chosen and checked against the set scanning frequency range. If it is within the set range, the method proceeds with Step 32 to determine a vibrating frequency of the sample. The vibration-driving unit 22 then vibrates the sample 9 at the determined vibrating frequency by a sine-wave motion. In Step 33, the image-acquiring unit 24 acquires an interference image from the vibrating sample 9. The interference image acquired is transmitted to the central control unit 20. The central control unit 20 then filters the noise of the interference image in Step 34 and normalizes the gray-scale distribution of the interference image in Step 35 to give a processed image.

In Step 36, the central control unit 20 continues to extract frequency-domain information from the processed images to calculate the fringe density index according to the spatial frequency distribution of fringes. In the present embodiment, autocorrelation function F4 proposed by Vollath (as expressed in equation 1) is employed to calculate the fringe density index of the interference images at the vibrating frequency. In Step 37, the fringe density index is recorded. Then, another scanning frequency is chosen as in Step 31. Steps 31 to 37 are repeated until scanning is performed at all frequencies in the set range. In Step 38, the fringe indexes of different scanning frequencies are analyzed by the central control unit 20 using band-pass filtering to detect the peak value.

Figure 8:
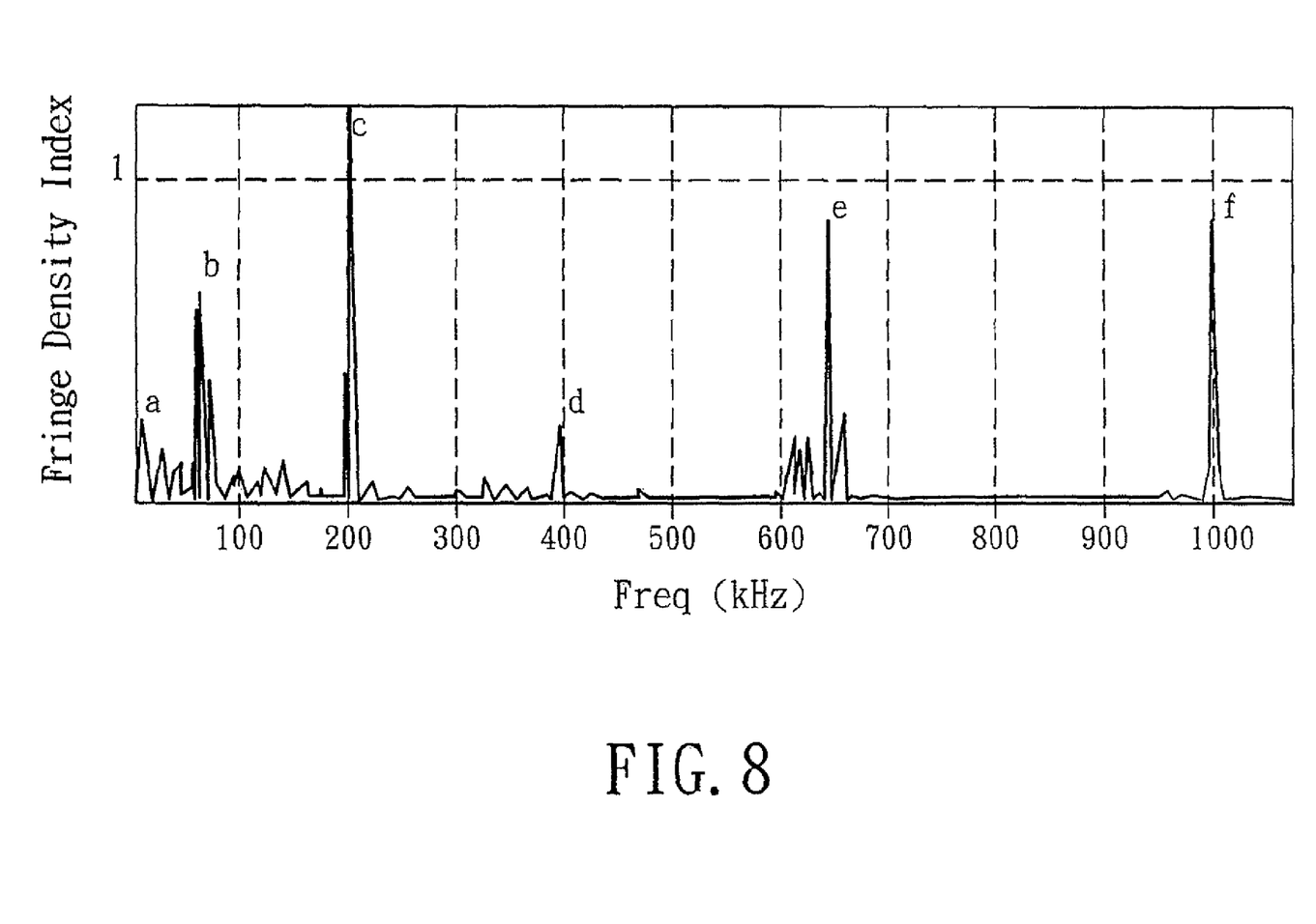
FIG. 8 is a graph showing the relation between the resonant frequency and the fringe density index of the vibrating sample.
Figure 9:
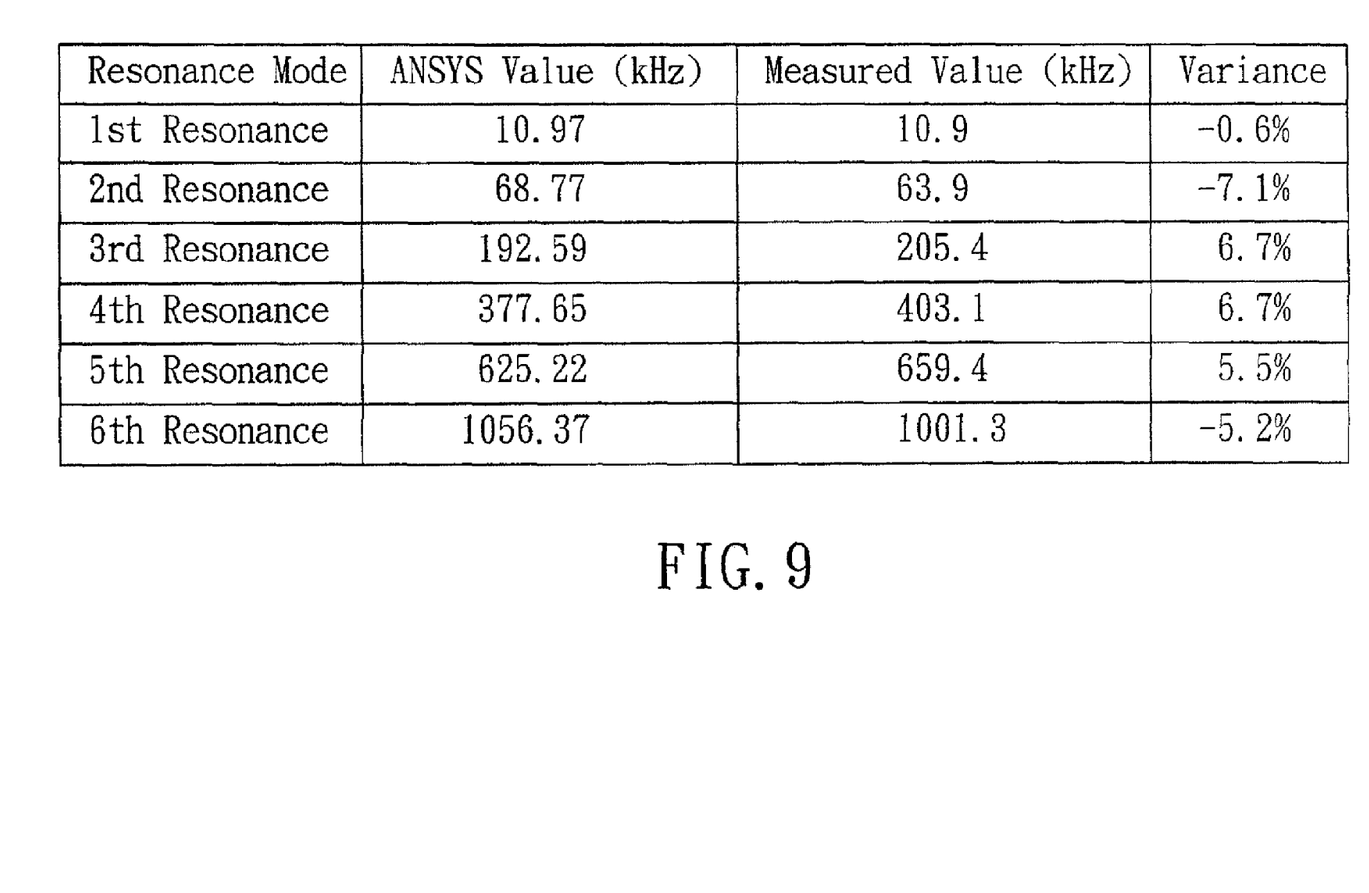
FIG. 9 shows the comparison between the theoretical resonant frequency and that identified from actual measurement.

FIG. 8 is a graph showing the relation between the resonant frequency and the fringe density index of the AFM probe. In FIG. 8, a to f represent the vibration modes of the sample. Finally, in Step 39, a resonant frequency of the vibrating sample is identified by analyzing the peak value detected. FIG. 9 shows the comparison between the theoretical resonant frequency and that identified from actual measurement. The measured values of the first to sixth resonant modes in FIG. 9 correspond to a to f in FIG. 8

Figure 10:
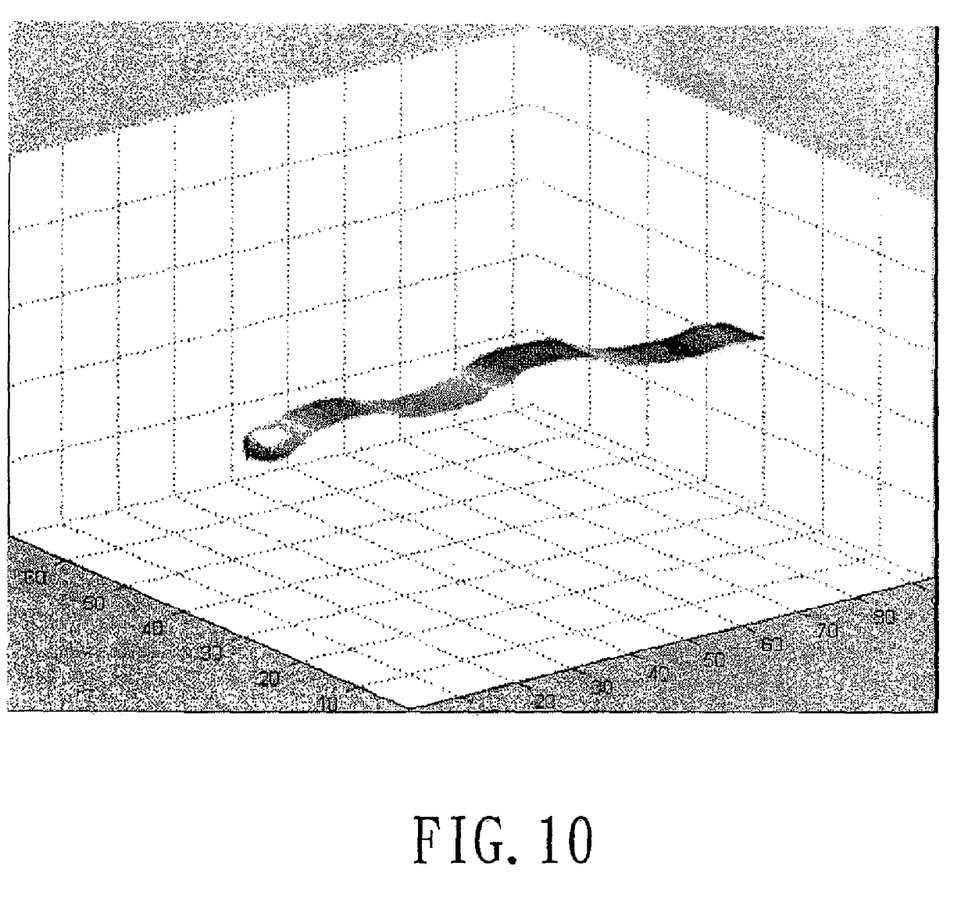
FIG. 10 shows a full-field vibratory surface profile in the fifth vibrating mode.

Finally, in Step 4, a full-field vibratory surface profile of the vibrating sample at the resonant frequency identified is established by full-field image reconstruction. The full-field image is reconstructed by the image-acquiring unit 24 together with the stroboscopic light-emitting unit 23 involving either phase-shift interferometry (PSI) or vertical scanning interferometry (VSI). FIG. 10 shows a full-field vibratory surface profile in the fifth vibrating mode (659.4 kHZ). In the present embodiment, the full-field vibratory surface profile is reconstructed using the image-acquiring unit with vertical scanning interferometry (VSI).

As described above, the present invention provides a method for out-of-plane displacement detection by analyzing the fringe density indexes calculated using frequency-domain information extracted from a series of interference images acquired from a sample vibrating at different frequencies.

In the present invention, the method for resonant frequency identification filters the interference images acquired from the vibrating sample using a stroboscopic flash. This image-filtering step can help retain more high-frequency image information, thus enhancing the accuracy of resonant frequency identification.

In the present invention, the method for resonant frequency identification also normalizes the interference images acquired to enhance the fringe contrast. This can help overcome the problem of unstable gray-scale value caused by variation in luminance in different acquired images.

In the present invention, the method for resonant frequency identification can establish a full-field vibratory surface profile of the sample in various resonance modes using full-field or partial-field image reconstruction according to the resonant frequency identified.

In the present invention, the apparatus for out-of-plane displacement detection and resonant frequency identification can be applied to a synchronous master-slave architecture, wherein a control frequency signal can be used as the primary control signal while a synchronous signal can be generated using a frequency divider or a delay circuit. The synchronous signal, serving as the secondary control signal, is to be transmitted to a stroboscopic light-emitting unit and an image-acquiring unit. The method can be used to overcome the signal synchronization problem occurred in low-frequency vibration measurement.

Although this invention has been disclosed and illustrated with reference to particular embodiments, the principles involved can be applied to numerous other embodiments that will be apparent to persons skilled in the art. This invention is, therefore, not limited only as indicated by the scope of the appended claims.

What is claimed is:

1. An apparatus for out-of-plane displacement detection and resonant frequency identification, comprising:
a central control unit;
a synchronous control unit, coupled to the central control unit for generating the first, second and third control signals synchronously with the control signal of the central control unit;
a vibration-driving unit for carrying and vibrating the sample upon receiving the first control signal;
a light-emitting unit for generating a stroboscopic flash upon receiving the second control signal; and
an image acquisition unit for acquiring a series of interference images from the sample upon receiving the third control signal, and transmitting the interference image acquired to the central control unit,
wherein the central control unit receives and processes the series of interference images by using image-filtering, extracts frequency-domain information from the series of processed interference images to calculate a fringe density index of each processed interference image, and detects the out-of-plane displacement of the vibrating sample from the fringe density indexes calculated.

2. The apparatus for out-of-plane displacement detection and resonant frequency identification as recited in claim 1, wherein the synchronous control unit further comprises:
a frequency divider for generating a frequency dividing signal upon receiving the control signal 90 from the wave-form generator;
a delay circuit for generating a delay signal upon receiving the frequency dividing signal from the frequency divider; and
a square-wave generator for receiving and converting the frequency dividing signal and the delay signal into square-wave signals to generate the second control signal.

3. The apparatus for out-of-plane displacement detection and resonant frequency identification as recited in claim 2, wherein the third control signal is generated either by the delay circuit or the square-wave generator.

4. The apparatus for out-of-plane displacement detection and resonant frequency identification as recited in claim 1, wherein the synchronous control unit further comprises:
a frequency divider for generating a frequency dividing signal upon receiving the control signal 90 from the wave-form generator;
a square-wave generator for generating a square-wave signal upon receiving the frequency dividing signal; and
a delay circuit for delaying the square-wave signal and generating the second control signal from the delayed square-wave signal.

5. The apparatus for out-of-plane displacement detection and resonant frequency identification as recited in claim 4, wherein the third control signal is generated either by the delay circuit or the square-wave generator.

6. The apparatus for out-of-plane displacement detection and resonant frequency identification as recited in claim 1, wherein the vibration-driving unit is a piezoelectric element (PZT) vibration-driving unit.

7. The apparatus for out-of-plane displacement detection and resonant frequency identification as recited in claim 1, wherein the control signal is a pulse, a sine-wave or a square-wave.

8. The apparatus for out-of-plane displacement detection and resonant frequency identification as recited in claim 1, wherein the light-emitting unit is a light-emitting diode.

9. An apparatus for out-of-plane displacement detection and resonant frequency identification, comprising:
a central control unit;
a synchronous control unit, coupled to the central control unit for generating the first, second and third control signals synchronously with the control signal of the central control unit;
a vibration-driving unit for carrying and vibrating the sample upon receiving the first control signal;
a light-emitting unit for generating a stroboscopic flash upon receiving the second control signal; and
an image acquisition unit for acquiring a series of interference images from the sample upon receiving the third control signal, and transmitting the interference image acquired to the central control unit;
wherein the central control unit receives and processes the series of interference images by using image-filtering, extracts frequency-domain information from the series of processed interference images to calculate a fringe density index of each processed interference image, and detects a peak value by analyzing all the fringe density indexes calculated to identify a resonant frequency of the vibrating sample.

10. The apparatus for out-of-plane displacement detection and resonant frequency identification as recited in claim 9, wherein the synchronous control unit further comprises:
   a frequency divider for generating a frequency dividing signal upon receiving the control signal 90 from the wave-form generator;
   a delay circuit for generating a delay signal upon receiving the frequency dividing signal from the frequency divider; and
   a square-wave generator for receiving and converting the frequency dividing signal and the delay signal into square-wave signals to generate the second control signal.

11. The apparatus for out-of-plane displacement detection and resonant frequency identification as recited in claim 10, wherein the third control signal is generated either by the delay circuit or the square-wave generator.

12. The apparatus for out-of-plane displacement detection and resonant frequency identification as recited in claim 9, wherein the synchronous control unit further comprises:
   a frequency divider for generating a frequency dividing signal upon receiving the control signal 90 from the wave-form generator;
   a square-wave generator for generating a square-wave signal upon receiving the frequency dividing signal; and
   a delay circuit for delaying the square-wave signal and generating the second control signal from the delayed square-wave signal.

13. The apparatus for out-of-plane displacement detection and resonant frequency identification as recited in claim 12, wherein the third control signal is generated either by the delay circuit or the square-wave generator.

14. The apparatus for out-of-plane displacement detection and resonant frequency identification as recited in claim 9, wherein the vibration-driving unit is a piezoelectric element (PZT) vibration-driving unit.

15. The apparatus for out-of-plane displacement detection and resonant frequency identification as recited in claim 9, wherein the control signal is a pulse, a sine-wave or a square-wave.

16. The apparatus for out-of-plane displacement detection and resonant frequency identification as recited in claim 9, wherein the light-emitting unit is a light-emitting diode.

\* \* \* \* \*

UNITED STATES PATENT AND TRADEMARK OFFICE
CERTIFICATE OF CORRECTION

PATENT NO. : 8,035,820 B2
APPLICATION NO. : 12/837419
DATED : October 11, 2011
INVENTOR(S) : Liang-Chia Chen et al.

It is certified that error appears in the above-identified patent and that said Letters Patent is hereby corrected as shown below:

ON THE TITLE PAGE:

At item (73), Assignee, change:

"(73) Assignee:   Industrial Technology Research Institute, Hsinchu (TW)"

to

--(73) Assignees:  Industrial Technology Research Institute, Hsinchu (TW);
  National Taipei University of Technology, Taipei (TW)--.

Signed and Sealed this
Third Day of January, 2012

David J. Kappos
*Director of the United States Patent and Trademark Office*